United States Patent [19]
Shannon et al.

[11] Patent Number: 5,852,894
[45] Date of Patent: Dec. 29, 1998

[54] FLIP FLOAT

[76] Inventors: Harry E. Shannon; Doug Shannon, both of 1303 Raymond Rd., Jackson, Miss. 38204

[21] Appl. No.: 916,737

[22] Filed: Aug. 18, 1997

Related U.S. Application Data

[63] Continuation of Ser. No. 582,761, Jan. 4, 1996, abandoned.

[51] Int. Cl.[6] .................................................. A01K 93/02
[52] U.S. Cl. .............................................. 43/17; 43/44.88
[58] Field of Search ..................... 43/17, 43.14, 44.87, 43/44.88, 44.9, 44.91, 44.92

[56] References Cited

U.S. PATENT DOCUMENTS

| | | | |
|---|---|---|---|
| 2,004,414 | 6/1935 | Menefee | 43/17 |
| 2,157,003 | 5/1939 | Mussina | 43/43.14 |
| 2,493,971 | 1/1950 | Johnson | 43/17 |
| 2,500,078 | 3/1950 | Ingram | 43/17 |
| 2,534,709 | 12/1950 | Goertzen | 43/17.5 |
| 2,544,968 | 3/1951 | Seigle | 43/17.5 |
| 2,722,763 | 11/1955 | Miner et al. | 43/17 |
| 2,779,122 | 1/1957 | Groff | 43/44.9 |
| 2,988,840 | 6/1961 | Seigle | 43/17 |
| 3,041,771 | 7/1962 | Hreno | 43/17.5 |
| 3,608,227 | 9/1971 | Adams | 43/17 |
| 3,739,513 | 6/1973 | Durham, Jr. | 43/17 |
| 4,748,761 | 6/1988 | Machovina | 43/17 |
| 5,048,219 | 9/1991 | Georgescu | 43/44.88 |
| 5,199,205 | 4/1993 | Klammer | 43/17 |
| 5,253,445 | 10/1993 | Spoonemore | 43/44.82 |

FOREIGN PATENT DOCUMENTS

| | | | |
|---|---|---|---|
| 547067 | 10/1957 | Canada . | |
| 2256721 | 8/1975 | France | 43/17 |
| 0162146 | 1/1949 | Germany | 43/44.92 |
| 2757-997 | 6/1979 | Germany . | |
| 1226464 | 3/1971 | United Kingdom | 43/17 |

*Primary Examiner*—Robert P. Swiatek
*Attorney, Agent, or Firm*—Gordon E. Baird

[57] ABSTRACT

A flip float is a fishing float having differently, distinguishably colored first and second halves with a tube extending through the float perpendicular to the interface between the halves. The tube contains a weight which shifts when a fish pulls on the fishing line and inverts the float. The weight moves between stops contained within the ends of the tube but outside of the float body which allows the weight to move at least partially outside of the body of the float. When the float is inverted, the weight shifts from one stop to the other and changes the center of gravity of the float which causes the float to remain inverted. A fisherman can tell at a glance, by noticing which color is out of the water, whether his line has been struck. Attachment of differently colored, reflecting material to the ends of the tube allows the fisherman to shine a light on the float at night to determine whether his line has been struck. Other embodiments of the invention operate upon the same principal of changing the center of gravity of the flip float when a fishing line attached to the float is struck by a fish.

4 Claims, 3 Drawing Sheets

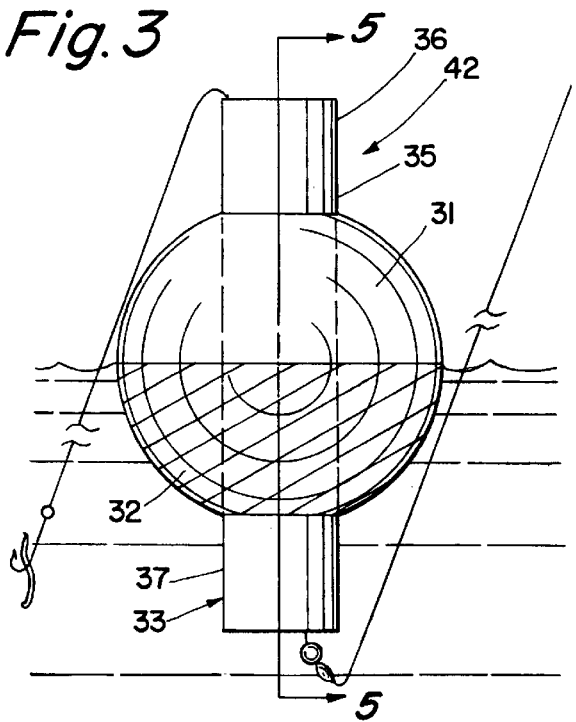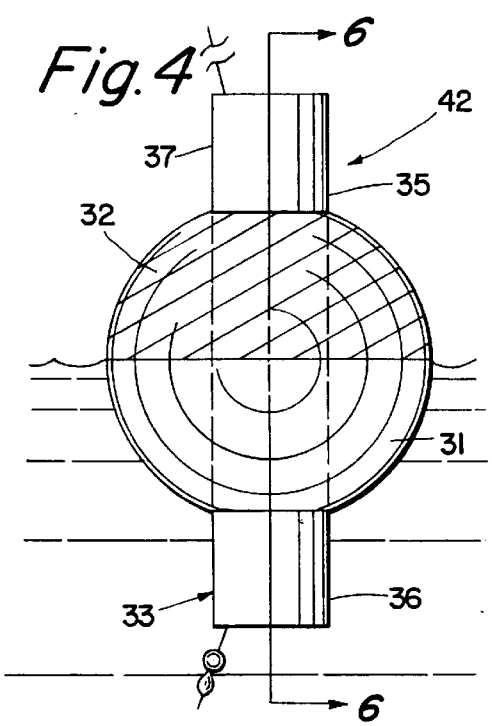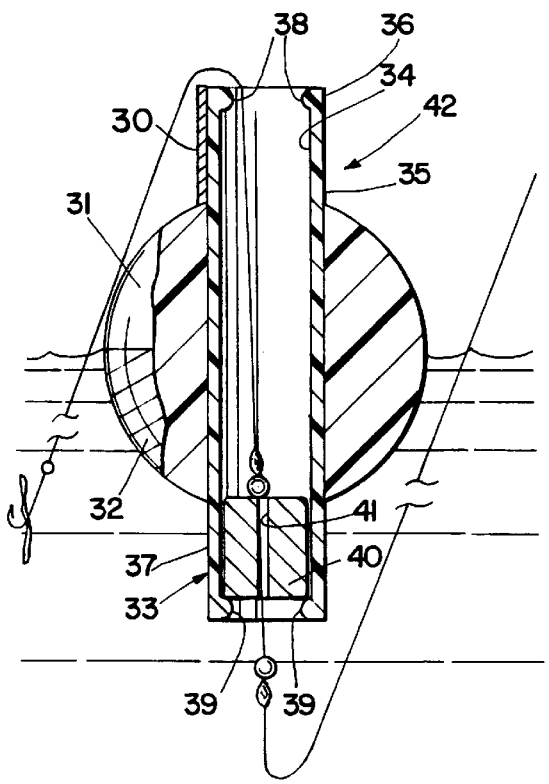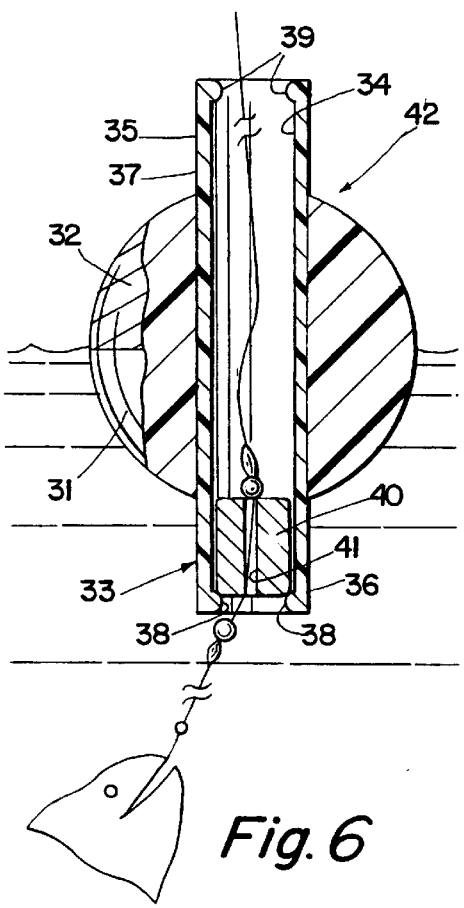

FLIP FLOAT

This application is a continuation of application Ser. No. 08/582,761, filed Jan. 4, 1996, now abandoned.

BACKGROUND OF THE INVENTION

1. Field of the Invention

This invention relates to fishing floats designed for sport fishing. This invention, the flip float, specifically relates to a fishing float which will alert a fisherman to the fact that a fish has struck his fishing line, even if the fishing is taking place at night.

Fishing floats have long been used by fishermen for a variety of purposes. A float can be used with a line and hook beneath it to deploy the hook (and bait) at a fixed depth. By watching to see when the float is pulled under the water the fisherman can tell when he has a bite. Another type of float is a slip float which has an eyelet or loop attached to the float through which a fisherman can run a line which is free to move. The movement of the line is restricted by stops attached to the line on either side of the eyelet. The line and float can then be cast whereupon the float will stay on the surface of the water and the line will slip downward through the eyelet until a stop is encountered. This will again deploy the hook at a depth lying between the surface and a preset depth set by the placement of a stop on the fishing line. The pulling of the float under the water will alert the fisherman that he has a bite. A slip float is very useful for surf fishing; however, when fishing in rough or choppy waters, it is often difficult to determine if there is a bite because of the water motion. This is not a problem with a flip float, because it turns to a different color when there is a bite, and the fisherman can see for sure what is going on.

A flip float consists of a float that will flip over and stay flipped over when the fishing line is pulled by a fish. The flip float contains a weight that shifts when the float is inverted so that the center of gravity of the float changes in such a manner that the float remains inverted after it is flipped over. The submerged part of the flip float is a different color from the part that is above the water, so it is readily apparent when a fish has taken the bait and turned the flip float over. Thus, if a fisherman is not looking when he gets a bite, he can tell at a glance whether a fish has taken the bait. With an ordinary float the fish may be on the hook but inactive so that the float may remain on the surface of the water giving no indication that one has had a bite.

A conventional fishing float is a good signaling device whose primary function is to go under the water when a fish bites. This action is a fisherman's signal to set the hook, but one must be watching this float at all times to know when or if there has been a bite. The flip float is a better signaling device. Its primary function is to have the visible part of the float turn a different color when a fish bites the hook. This action is a signal for the fisherman to set the hook whether the flip float goes under the water or not.

2. Description of Prior Art

A flip type float containing an internal weight which slides to invert the float is described in Canada Patent No. 547,067. The float consists of a hollow spherical body with a wire fixed about a diameter of the sphere and the weight constrained to slide along the wire. The weight is contained entirely within the hollow spherical body of the float. A second embodiment disclosed in the patent consists of a hollow spherical body containing a spherical or cylindrical weight constrained to move within a tube contained entirely within the hollow spherical body.

The present invention is of simplified construction, and it solves the problem of creating a fishing float which will let a fisherman know whether a fish has struck his line, even at night, by the introduction of a fishing float with a moveable weight contained within a tube which in turn extends outside of the body of the float. The weight shifts when the float is overturned and passes through the body of the float and at least partially outside of its periphery. This design leads to a lower center of gravity than the design of previous flip type floats; the lower center of gravity in turn makes the float more stable when in either of its two equilibrium positions. The introduction of reflecting materials of different, distinguishable colors on the top and bottom of the float makes it possible to tell at night, by shining a light on the float, whether the float has been inverted due to a fish striking the line.

SUMMARY OF THE INVENTION

A first embodiment of the flip float has a floatation ball with differently, distinguishably colored halves, a tube which extends through the floatation ball, stops attached within either end of the tube and a weight disposed to slide within the tube between stops with the fishing line attached to the weight in this embodiment. A pull on a fishing line attached to the weight will cause the flip float to turn over and the weight to shift and move from one set of stops to the other set of stops where it remains until retrieved by the user. When the flip float turns over to the inverted position, the color of the half lying above the surface of the water is different and distinguishable from the color of the half that was above the surface of the water before the float was inverted.

A second embodiment of the flip float comprises a floatation ball having two differently, distinguishably colored halves, an axial bore extending through the floatation ball perpendicular to the plane of intersection of the two halves and a cylindrical weight which extends beyond the periphery of the floatation ball at both ends of the bore. The weight is disposed to slide freely within the cylindrical bore. Within grooves on the outer surface of the ends of the weight elastic O-rings are positioned to control the range of motion of the weight. The O-rings prevent the weight from sliding further into the ball than the position of the O-ring. This allows a fisherman to control the sensitivity of the pull on the line required to invert the flip float. Also, a fisherman can remove the elastic O-ring on one end of the flip float and reverse the direction that the cylindrical weight extends through the float. This changes the colored part of the float which is above the water when the flip float is deployed for fishing, that is, the fisherman can have either side up when the float is in its normal fishing position.

Flip floats can be used with fishing poles of any type as well as rod and reel of any type. They are useful for surf casting, for use as a free floating flip float (jug fishing), for use while tied onto an object such as a pier or snag, and for use with an anchored array of hooks. Also, a fisherman can place an array of flip floats in the water within sight of his camp so that the array can be observed as to activity without leaving camp; the fisherman need not leave camp until he is ready to take some fish off of the hooks.

It is accordingly an objective of the invention to provide a flip float device for fishing which will invert and remain inverted from its normal position when deployed when a fish tugs on the fishhook.

A further objective of this invention is to provide a flip float which may be colored differently upon its upper and lower halves so that a fisherman can tell where the action is at any time during day or night from a great distance away.

A further objective of the invention is to provide reflective materials of differing colors on the ends of the tube extending through the flip float so that a fisherman fishing at night can shine a light on the float and at a glance tell whether there has been a bite by a fish on the fishhook.

A further objective of the invention is to provide a means for adjusting the sensitivity of the flip float for inverting and remaining inverted so as to allow the float to be adjusted for existing conditions.

A further objective of the invention is to provide for a flip float which may be deployed for float fishing by letting the flip float be deployed alone on the water when fishing for fish such as catfish.

A further objective of the invention is to provide for a flip float which may be deployed by casting with a fishing rod.

A further objective of this invention is to provide a flip float which may be used as a slip float.

A further objective of this invention is to provide a flip float which may be used for jug fishing, casting or surf fishing.

A final objective is to provide for a flip float which has simplicity of construction, inexpensive manufacture and efficient, easy operation.

BRIEF DESCRIPTION OF THE DRAWINGS

FIG. 3 is a view in elevation of a first embodiment of the flip float in an upright position wherein provision is made for attaching a fishing line to the flip float by passing a fishing line with stops thereon through the weight of the flip float.

FIG. 4 is a view in elevation of the flip float of FIG. 3 in an inverted position after having been inverted by a pull upon a fishing line attached to the flip float.

FIG. 5 is a sectional view of the flip float in an upright position taken along lines 5—5 in FIG. 3.

FIG. 6 is a sectional view of the flip float in an inverted position taken along lines 6—6 in FIG. 4.

DESCRIPTION OF THE PREFERRED EMBODIMENTS

Figure 1:
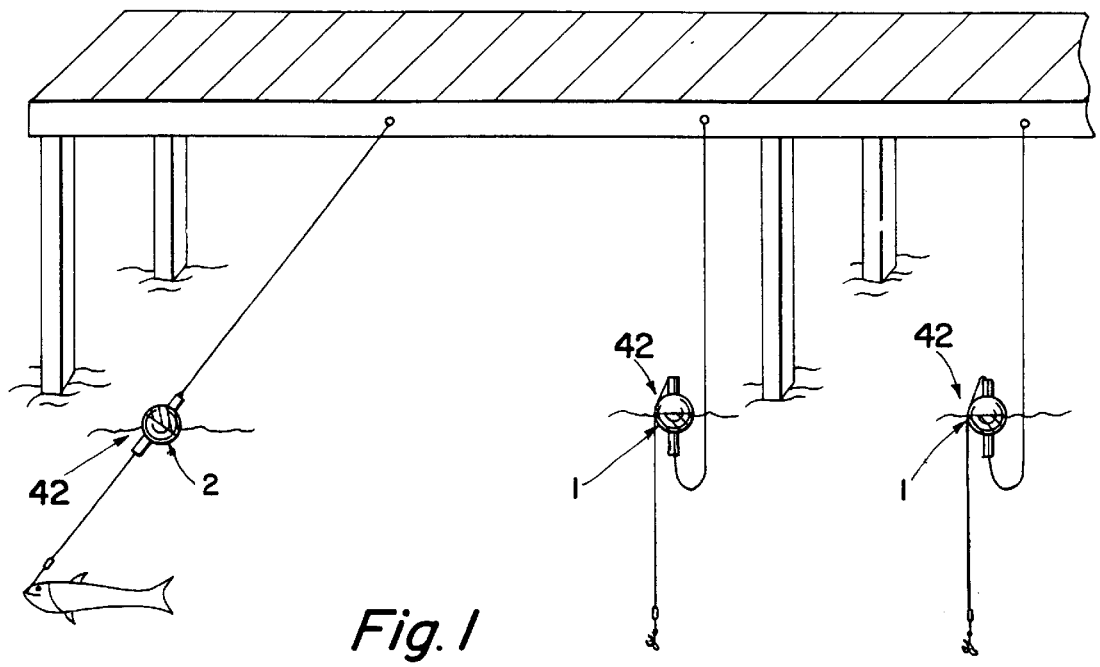
FIG. 1 shows the use of the flip float deployed in the water with the float attached to a dock.

Referring now to the drawings, FIG. 1 shows the use of a flip float secured to a dock or snag. Reference numeral 42 indicates the flip float as a whole while reference numeral 1 indicates a flip float in the upright position which is deployed for fishing. Reference numeral 2 indicates a flip float in the inverted position, the inversion of the flip float being caused by a fish having struck the fishing line.

Figure 2:
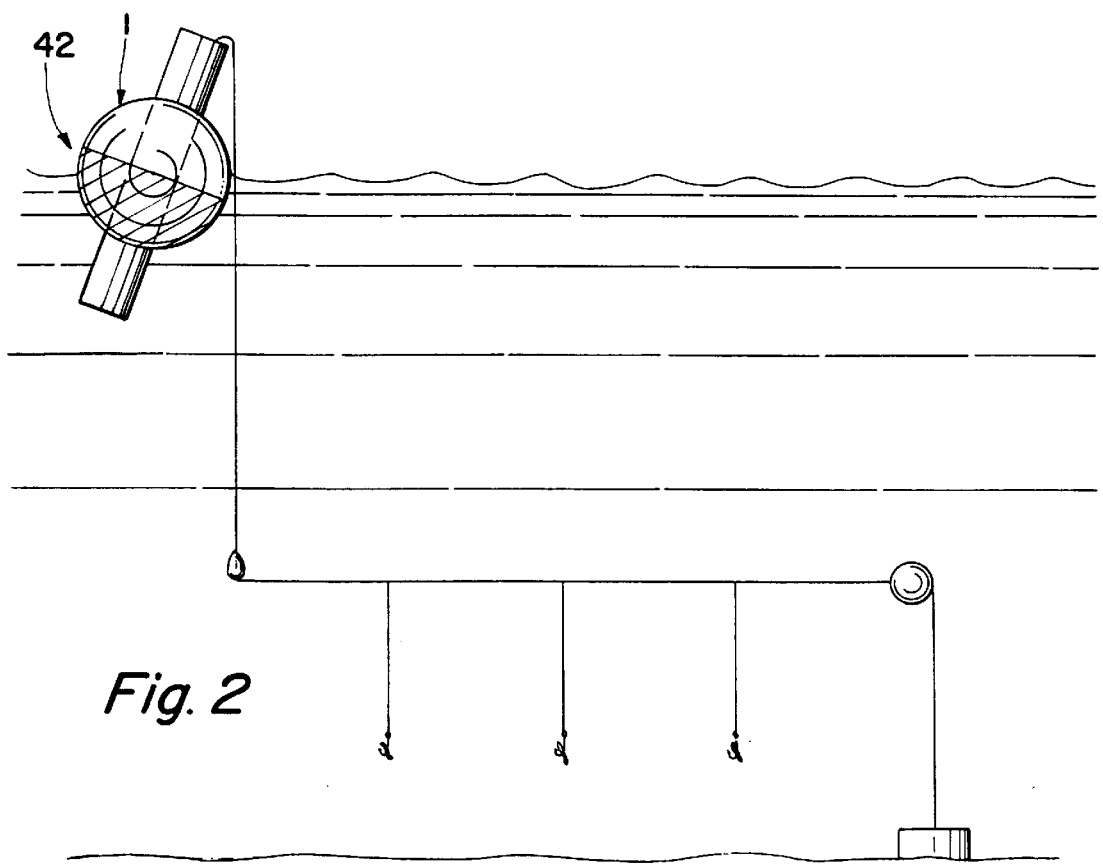
FIG. 2 shows the use of the flip float deployed with an array of hooks on a single line anchored to the bottom through a submerged float.

FIG. 2 illustrates the use of a flip float 1 deployed in an upright position with an array of hooks on a single line anchored to the bottom through a submerged float. The line from the flip float passes through a lead sinker, thence horizontally to a submerged float thence downward to a submerged weight. Hooks are deployed beneath the horizontal portion of the line so that a strike on any of the hooks will cause the flip float to invert alerting the fisherman to a strike by a fish.

FIG. 3 shows first embodiment of a flip float floating in an upright position as the flip float is when deployed for fishing. The flip float 42, comprises a floatation ball with a first half 31 having a first distinct, distinguishable color and a second half 32 having a second distinct, distinguishable color, and tube 33 having inner surface 34, outer surface 35, first end 36 and second end 37. The first end extends outside of the outer surface of the first half of the floatation ball, and the second end extends outside of the outer surface of the second half of the floatation ball. When the flip float is deployed in water for fishing, the first distinct, distinguishable color is exposed above the surface of the water. Reflecting material 30 of a first distinct, distinguishable color is attached to the outer surface of the first end of tube; similarly a reflecting material of a second distinct, distinguishable color is attached to the outer surface of the second end of the tube. Shining a flashlight on the reflecting material at night reveals whether the float is upright or inverted.

FIG. 4 shows the flip float of FIG. 3 in an inverted position as is when a fishing line attached to it has been struck by a fish. If, when cast, the flip float should not be disposed in the proper orientation for use fishing but is instead disposed in the inverted position of FIG. 4., the flip float may be set by giving the line a quick twitch which will pull the flip float towards the fisherman and pull the weight to the second end of the float where the line goes toward the fisherman. Following the quick twitch of the line the weight will now be disposed within the second end of the tube and, when the line is released, the flip float will settle in the water with the second half of the flip float beneath and the first half of the flip float exposed above the surface of the water in the proper orientation for use.

FIG. 5 is a side sectional view taken along sectional line 5—5 in FIG. 3. First protuberances 38 are located beyond first intersection 43 of the first end of the tube with first half and within the inner surface of the first end 36. Second protuberances 39 are located beyond second intersection 44 of the second end of the tube with the second half and within the inner surface of the second end 37. Weight 40 is disposed so as to slide within said tube and resides against the second protuberances which act as a stop. Weight 40 has cylindrical bore 41 running axially through the weight. When the flip float is floating in water, as when deployed for fishing, a fishing line can be strung through the cylindrical bore 41 with the motion of the fishing line limited by stops attached to the fishing line on either side of the weight. When a hook connected to the fishing line is pulled, the line runs through the weight until one of the stops on the fishing line encounters the weight whereupon the flip float turns over to an inverted position as shown in FIG. 4. The weight slides downward in said tube coming into contact with first protuberances within the first end of the tube as shown in the sectional view of FIG. 6, which is a sectional view taken along line 6—6 in FIG. 4. The second hemisphere rests now above the surface of water displaying the second color alerting a fisherman to the fact that the flip float is inverted due to a fish striking his line.

Figure 7:
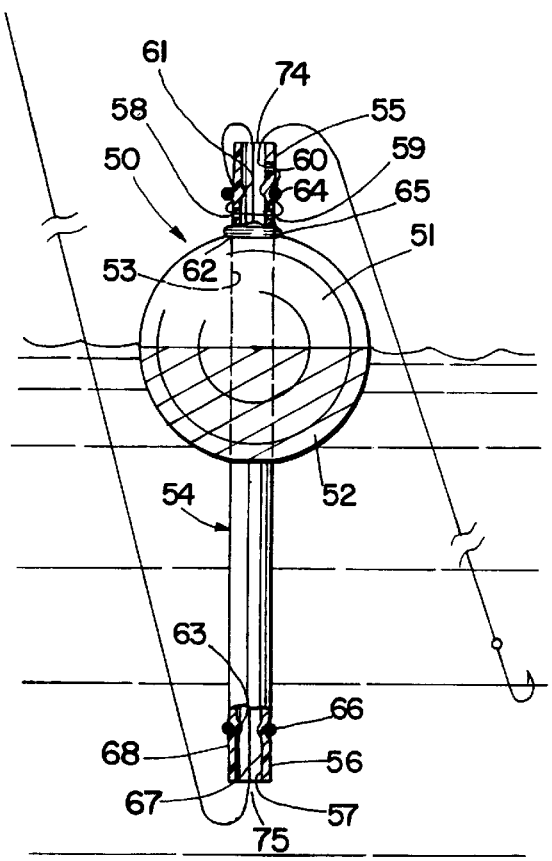
FIG. 7 is a sectional view partially in elevation of a second embodiment of a flip float in an upright position having a cylindrical weight which slides within an axial bore when the float is inverted.

FIG. 7 is a drawing partially in elevation and partially in cross section of a third embodiment of flip float 50. The flip float is in an upright position in FIG. 7. The flip float has a spherical body having first half 51 having a first distinct, distinguishable color and second half 52 having a second distinct, distinguishable color. Bore 53 extends diametrically through the spherical body and is perpendicular to the interface between the two halves. Cylindrical weight 54 has first end 55, second end 56, axial bore 57, inner surface 67 and outer surface 68. The first end has first terminus 74, and the second end has second terminus 75. First O ring 65 disposed in first groove 61 on the outer surface of the first end of the cylindrical weight and second O-ring 66 disposed in second groove 63 on the outer surface of the second end of the cylindrical weight act as stops to limit the sliding motion of the cylindrical weight within the bore. In FIG. 7 the cylindrical weight rests against the first O-ring and the flip float is disposed in an upright position for fishing with a first distinct, distinguishable color exposed above the surface of the water. A fishing line enters the axial bore 57 of the cylindrical weight through the second terminus 75 of the second end and out the first terminus 74 of the first end of the cylindrical weight thence the line passes under third O-ring 64 disposed in third groove 61, through first orifice 58, through second orifice 59, under the third O-ring 64 through third orifice 60 into the bore and out the axial bore through the first terminus of the first end of the cylindrical weight and thence to a fishing line. A pull on the fishing line causes the flip float disposed as in FIG. 7 to invert whereupon the cylindrical weight will slide within the bore until its motion is stopped by the second O-ring. Then the flip float will be disposed in the inverted position as shown in FIG. 8.

Figure 8:
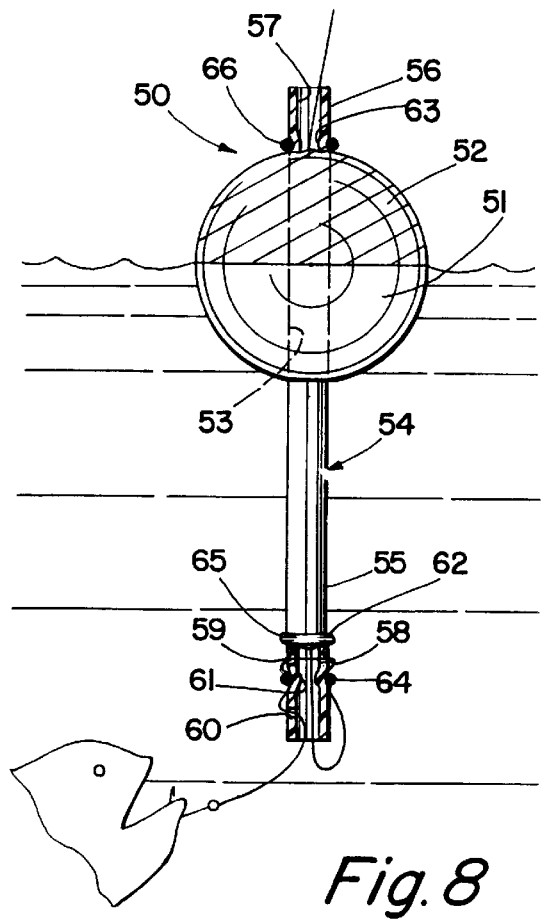
FIG. 8 is a sectional view partially in elevation of the flip float of FIG. 7 but in an inverted position after having been inverted by a pull on the fishing line.

FIG. 8 shows the flip float in the inverted position in which the second half of the flip float is exposed above the surface of the water and the second O-ring is acting as a stop limiting the motion of the cylindrical weight. The second half exposed above the surface of the water alerts a fisherman that his line has been struck. If, when deployed, the flip float should not be disposed in the proper orientation for use in fishing but is instead disposed in the inverted position of FIG. 8, the flip float may be set by giving the line a quick twitch which will pull the float towards the fisherman and will pull the cylindrical weight 54 out of the second half of the flip float where the line goes toward the fisherman. Following the quick twitch of the line the cylindrical weight will now extend substantially out of the second half of the flip float and, when the line is released, the flip float will settle in the water with the second half of the flip float beneath and the first half of the flip float exposed above the surface of the water in the proper orientation for use.

Figure 9:
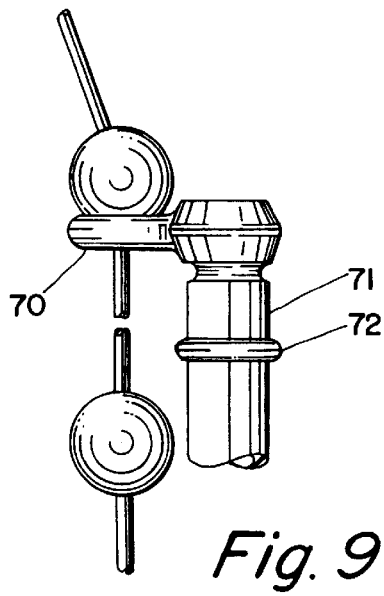
FIG. 9 is a view in elevation of an alternate means for attaching a fishing line to the flip float of FIGS. 7 and 8 for adapting the flip float for use as a slip float.
Figure 10:
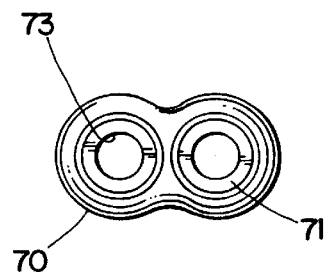
FIG. 10 is a top view of the attaching means of FIG. 9.

FIG. 9 illustrates an alternate provision for attaching a fishing line to a flip float so that the flip float may be used as a slip float. Eyelet 70 is attached to the first end of cylindrical weight 71 of a flip float constructed as in FIGS. 7 and 8. A fishing line may be deployed through the eyelet with stops located on the fishing line on either side of the eyelet. The fishing line will be deployed at a depth fixed by the placement of the stops on the fishing line. A weight attached to the fishing line (just above the hook) will pull the fishing line down through the eyelet until a stop on the fishing line comes into contact with the eyelet whereupon the flip float will be inverted by the force of the tug on the fishing line. The flip float will invert and the weight will shift to keep the flip float inverted as described above. FIG. 10 is a top view showing the attachment of the eyelet to the cylindrical weight with a fishing line passing through eyelet orifice 73. O-ring 72 acts as a stop on the cylindrical weight when the flip float is in an upright position.

We claim:

1. A flip float, which will completely invert and remain inverted until reset by the fisherman when a fishing line attached to the flip float is struck by a fish, comprising a buoyant body which will float in water said body further having a first half whose exterior is of a first distinct, distinguishable color and a second half whose exterior is of a second distinct, distinguishable color;

a tube, having an inner surface, an outer surface, a first end and a second end, said tube extending through the said buoyant body with said first end lying outside of the said first half of the buoyant body and said second end being outside of said second half of said buoyant body;

a first stop rigidly affixed to the inner surface of said first end of said tube and lying beyond the first intersection of the first end of said tube with the first half of said buoyant body wherein said first stop consists of a first plurality of raised protuberances lying on the inner surface of said first end of said tube;

a second stop rigidly affixed to the inner surface of said second end of said tube and lying beyond the second intersection of the said second end of said tube with the second half of said buoyant body wherein said second stop consists of a second plurality of raised protuberances lying on the inner surface of said second end of said tube;

a weight disposed to slide within said tube and lying between said first and second stops;

and attaching means for attaching a fishing line to said weight, whereby the flip float will completely invert and remain inverted until reset by the fisherman when a fishing line attached to the flip float is struck by a fish.

2. A flip float, which will completely invert and remain inverted until reset by the fisherman when a fishing line attached to the flip float is struck by a fish, comprising a buoyant body which will float in water said body further having a first half whose exterior is of a first distinct, distinguishable color and a second half whose exterior is of a second distinct, distinguishable color;

a tube, having an inner surface, an outer surface, a first end and a second end, said tube extending through the said buoyant body with said first end lying outside of the said first half of the buoyant body and said second end being outside of said second half of said buoyant body;

a first stop rigidly affixed to the inner surface of said first end of said tube and lying beyond the first intersection of the first end of said tube with the first half of said buoyant body;

a second stop rigidly affixed to the inner surface of said second end of said tube and lying beyond the second intersection of the said second end of said tube with the second half of said buoyant body;

a weight disposed to slide within said tube and lying between said first and second stops wherein said weight has a first end and a second end, said weight containing a cylindrical bore extending from said first end to said second end;

a fishing line extending through said cylindrical bore;

a third stop attached to said fishing line past the point said fishing line extends out of said bore past said first end of said weight; and a fourth stop attached to said fishing line past the point said fishing line extends out of said bore past the second end of said weight, whereby the flip float will completely invert and remain inverted until reset by the fisherman when a fishing line attached to the flip float is struck by a fish.

3. A flip float, which will completely invert and remain inverted until reset by the fisherman when a fishing line attached to the flip float is struck by a fish, comprising a buoyant body which will float in water, said buoyant body having a first half of a first distinct, distinguishable color and a second half of a second distinct, distinguishable color;

a bore through said buoyant body extending through both the first half and the second half of said buoyant body, said bore further being perpendicular to the interface of said first half with said second half of said buoyant body;

a cylindrical weight having a first end and a second end and having length greater than the length of said bore and being disposed to slide within said bore with first end of said cylindrical weight extending at least partially out of said bore outside of said first half of said buoyant body and with second end of said cylindrical weight extending out at least partially of said bore outside of said second half of said buoyant body;

stopping means attached to said first end of said cylindrical weight limiting the extent to which said first end of said cylindrical weight can penetrate into said bore comprising:

a first groove located on the outer surface of the first end of said cylindrical weight; and a first O-ring elastically disposed in said first groove;

stopping means attached to said second end of said cylindrical weight limiting the extent to which said second end of said cylindrical weight can penetrate into said bore comprising:

a second groove located on the outer surface of the second end of said weight; and a second O-ring elastically disposed in said second groove; and means for attaching a fishing line to said first end of said cylindrical weight, whereby the flip float will completely invert and remain inverted until reset by the fisherman when a fishing line attached to the flip float is struck by a fish.

4. A flip float, which will completely invert and remain inverted until reset by the fisherman when a fishing line attached to the flip float is struck by a fish, comprising a buoyant body which will float in water, said buoyant body having a first half of a first distinct, distinguishable color and a second half of a second distinct, distinguishable color;

a bore through said buoyant body extending through both the first half and the second half of said buoyant body, said bore further being perpendicular to the interface of said first half with said second half of said buoyant body;

a cylindrical weight having a first end and a second end and having length greater than the length of said bore and being disposed to slide within said bore with first end of said cylindrical weight extending at least partially out of said bore outside of said first half of said buoyant body and with second end of said cylindrical weight extending out at least partially of said bore outside of said second half of said buoyant body;

stopping means attached to said first end of said cylindrical weight limiting the extent to which said first end of said cylindrical weight can penetrate into said bore wherein said stopping means attached to said first end of said cylindrical weight comprising a first O-ring elastically disposed on the outer surface of said first end of said cylindrical weight;

stopping means attached to said second end of said cylindrical weight limiting the extent to which said second end of said cylindrical weight can penetrate into said bore wherein said stopping means attached to said second end of said cylindrical weight comprising a second O-ring elastically disposed on the outer surface of said second end of said cylindrical weight; and means for attaching a fishing line to said first end of said cylindrical weight, whereby the flip float will completely invert and remain inverted until reset by the fisherman when a fishing line attached to the flip float is struck by a fish.

* * * * *